(12) United States Patent
Numata et al.

(10) Patent No.: US 7,986,515 B2
(45) Date of Patent: Jul. 26, 2011

(54) IMAGE DISPLAY APPARATUS

(75) Inventors: Koichi Numata, Tokyo (JP); Takashi Bunya, Kanagawa (JP); Takumi Endoh, Kanagawa (JP)

(73) Assignee: Sony Corporation, Tokyo (JP)

( * ) Notice: Subject to any disclaimer, the term of this patent is extended or adjusted under 35 U.S.C. 154(b) by 0 days.

(21) Appl. No.: 12/961,941

(22) Filed: Dec. 7, 2010

(65) Prior Publication Data

US 2011/0075344 A1    Mar. 31, 2011

Related U.S. Application Data

(63) Continuation of application No. 12/356,841, filed on Jan. 21, 2009, now Pat. No. 7,864,515.

(30) Foreign Application Priority Data

Jan. 22, 2008  (JP) ................................ P2008-011094

(51) Int. Cl.
*G06F 1/16* (2006.01)
(52) U.S. Cl. .................. 361/679.21; 40/735; 248/122.1; 348/794
(58) Field of Classification Search ............. 361/679.22, 361/679.21
See application file for complete search history.

(56) References Cited

U.S. PATENT DOCUMENTS

| | | | |
|---|---|---|---|
| 3,990,670 A | 11/1976 | Frechtman | |
| 5,068,987 A * | 12/1991 | Tontarelli | 40/753 |
| 5,329,712 A * | 7/1994 | Keller | 40/747 |
| 6,003,260 A * | 12/1999 | Chang | 40/748 |
| 6,441,828 B1 | 8/2002 | Oba et al. | |
| 6,532,628 B2 | 3/2003 | Kim | |
| 6,543,734 B2 | 4/2003 | Yeh | |
| 6,570,627 B1 | 5/2003 | Chang | |
| 6,651,943 B2 * | 11/2003 | Cho et al. | 248/122.1 |
| 6,678,153 B2 | 1/2004 | Chen et al. | |
| 6,771,329 B2 | 8/2004 | Hung et al. | |
| 6,899,311 B1 | 5/2005 | Ternus | |
| 6,915,995 B2 | 7/2005 | Gillespie | |
| 7,167,358 B2 | 1/2007 | Iwasaki et al. | |

(Continued)

FOREIGN PATENT DOCUMENTS

JP            3 114876          11/1991
(Continued)

*Primary Examiner* — Lisa Lea-Edmonds
(74) *Attorney, Agent, or Firm* — Frommer Lawrence & Haug LLP; William S. Frommer; Thomas F. Presson

(57) ABSTRACT

An image display apparatus includes a casing, a stand, and an image display section. The stand is formed of a single rod. The image display apparatus further includes a link mechanism that links the rod and a portion of the rear surface, supports the rod so as to be pivotal between a falling-down position where the rod falls down on the rear surface and a standing position where the rod stands from the rear surface, and locks and holds the rod to the falling-down position and the standing position. The rod is located at the standing position and one of two long sides of the casing and the leading end of the rod are placed onto a placing surface, whereby a first posture in which the casing stands with a first angle with respect to the placing surface is formed. The rod is located at the standing position and one of two short sides of the casing and the leading end of the rod are placed onto the placing surface, whereby a second posture in which the casing stands with a second angle with respect to the placing surface is formed.

5 Claims, 19 Drawing Sheets

U.S. PATENT DOCUMENTS

| | | | |
|---|---|---|---|
| 7,233,488 B2 | 6/2007 | Liou et al. | |
| 7,239,506 B2 | 7/2007 | Ogawa et al. | |
| 7,245,481 B2 | 7/2007 | Shimizu et al. | |
| 7,301,759 B2 | 11/2007 | Hsiung | |
| 7,364,126 B2 | 4/2008 | Tsai et al. | |
| 7,489,500 B2 | 2/2009 | Liou et al. | |
| 7,580,248 B2 | 8/2009 | Ogawa et al. | |
| 7,681,859 B2 | 3/2010 | Kim | |
| 7,770,862 B2 * | 8/2010 | Chen | 248/351 |
| 7,864,515 B2 * | 1/2011 | Numata et al. | 361/679.21 |
| 2004/0257758 A1 * | 12/2004 | Krieger et al. | 361/683 |
| 2005/0126061 A1 * | 6/2005 | Lin | 40/735 |
| 2006/0050471 A1 | 3/2006 | Chen | |
| 2006/0113382 A1 * | 6/2006 | Singgih et al. | 235/383 |
| 2007/0012856 A1 | 1/2007 | Chan et al. | |
| 2007/0121280 A1 | 5/2007 | Yang | |
| 2007/0127197 A1 | 6/2007 | Tae et al. | |
| 2008/0253067 A1 | 10/2008 | Liou et al. | |
| 2009/0059052 A1 * | 3/2009 | Lin et al. | 348/333.01 |
| 2009/0185338 A1 * | 7/2009 | Numata et al. | 361/679.06 |

FOREIGN PATENT DOCUMENTS

| | | |
|---|---|---|
| JP | 11 331735 | 11/1999 |
| JP | 2000 148440 | 5/2000 |
| JP | 2000 283387 | 10/2000 |
| JP | 2001 195002 | 7/2001 |
| JP | 2003 169734 | 6/2003 |
| JP | 2004 70279 | 3/2004 |
| JP | 2005 137521 | 6/2005 |
| JP | 2009175205 A * | 8/2009 |

* cited by examiner

FIG.6A
FIG.6B
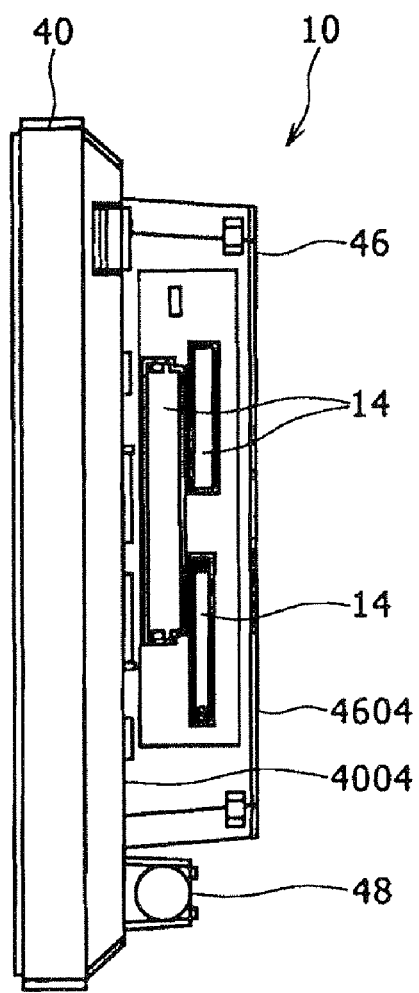
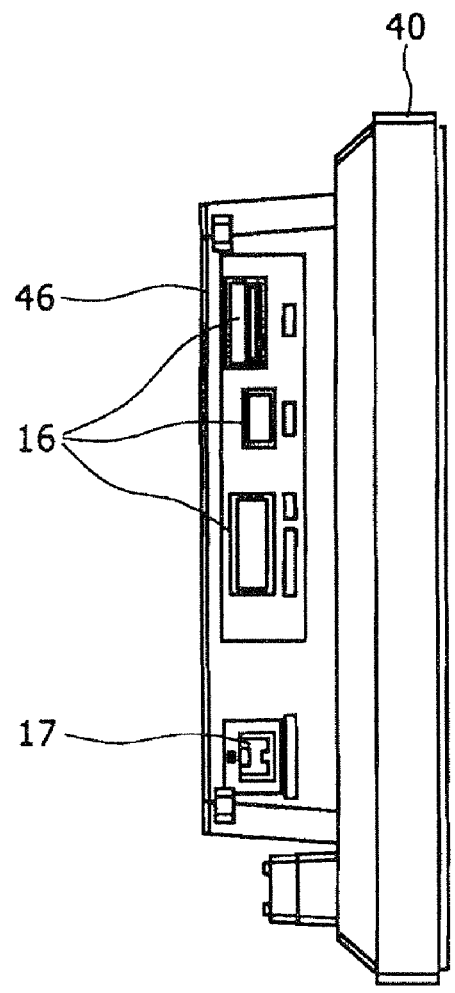

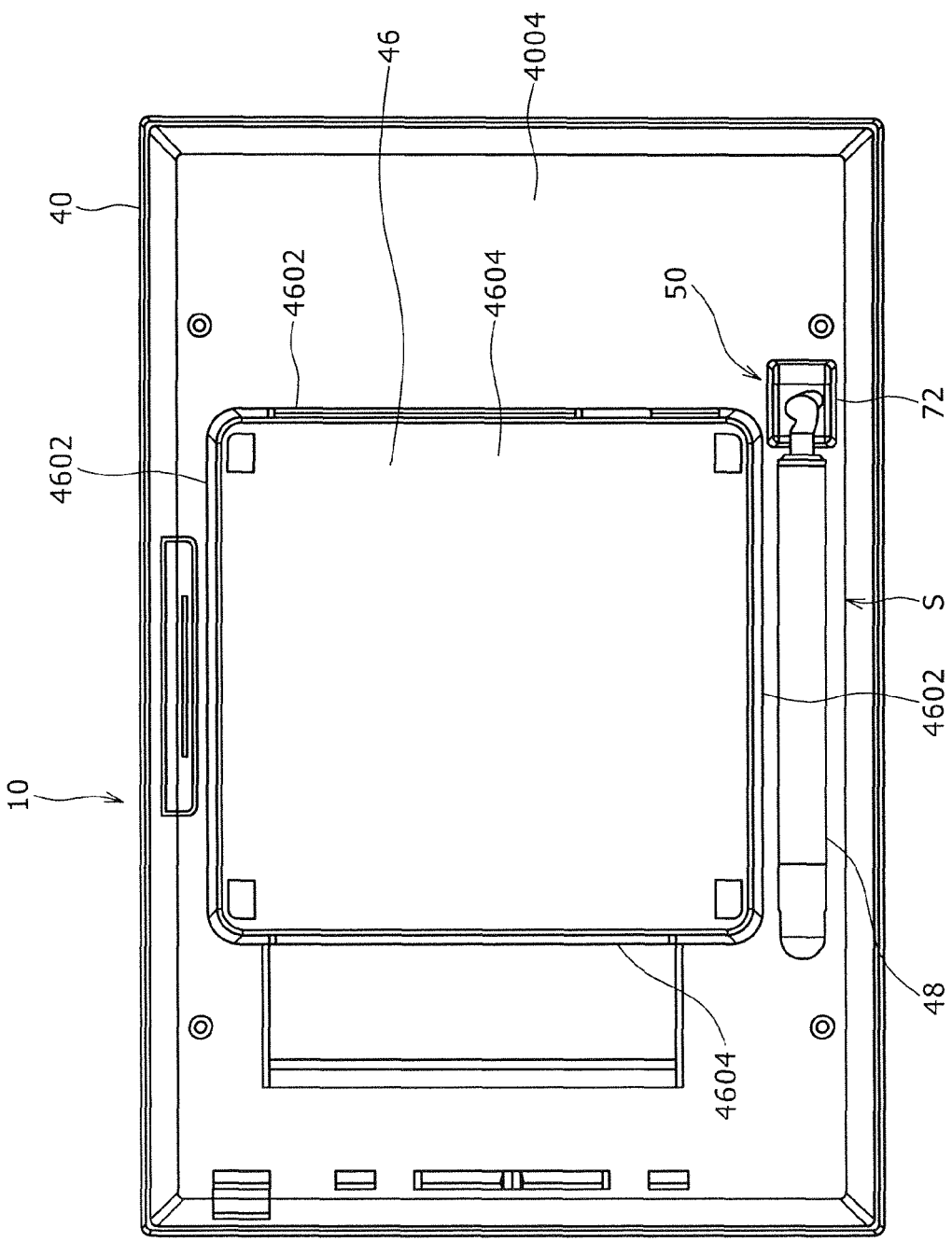

ated Arts

IMAGE DISPLAY APPARATUS

This is a Continuation of U.S. Ser. No. 12/356,841, filed on Jan. 21, 2009, now U.S. Pat. No. 7,864,515 which claims the benefit of Japanese Application P2008-011094 filed Jan. 22, 2008. The entirety all of which are hereby incorporated by reference herein.

CROSS REFERENCE TO RELATED APPLICATION

The present invention contains subject matter related to Japanese Patent Application JP 2008-011094 filed in the Japanese Patent Office on Jan. 22, 2008, the entire contents of which being incorporated herein by reference.

BACKGROUND OF THE INVENTION

1. Field of the Invention

The present invention relates to an image display apparatus.

2. Description of the Related Arts

An image display apparatus has been proposed as a device by which a user readily enjoys image data recorded on a recording medium such as a memory card by means of a digital still camera or the like.

The proposed image display apparatus has a configuration including a display surface on which an image is displayed on a front surface of a rectangular flat casing, and an image display section that allows the image read from the memory card to be displayed on the display surface (see, for example, JP 2000-148440).

When a user enjoys an image by using the image display apparatus of this type, the user mounts a base end of a leg, which serves as a stand, to the rear surface of the casing by means of a screw, and places one side of the casing and a leading end of the leg onto a placing surface in order to allow the display surface to erect onto the placing surface.

SUMMARY OF THE INVENTION

However, in the image display apparatus in related art, the leg is mounted to the rear surface. Therefore, when the image display apparatus is housed, the leg protrudes from the rear surface if the leg remains mounted, which is disadvantageous in housing property. Although the image display apparatus can be housed with the leg removed, the screw has to be removed by using a tool such as a driver, which is inconvenient.

The present invention is accomplished in view of the foregoing circumstance, and aims to provide an easy-to-use image display apparatus.

According to an embodiment of the present invention, there is provided an image display apparatus includes a flat rectangular plate-like casing; a display surface formed on a front surface that is one surface of the casing in the thickness direction; a stand provided to the rear surface that is the other surface of the casing in the thickness direction; and an image display section provided to the casing for allowing an image to be displayed onto the display surface, wherein the stand is composed of a single rod linearly extending, the image display apparatus including a link mechanism that links the rod and a portion of the rear surface, supports the rod so as to be pivotal between a falling-down position where the rod falls down on the rear surface and a standing position where the rod stands from the rear surface, and locks and holds the rod to the falling-down position and the standing position, wherein a first posture is formed by locating the rod at the standing position and by placing one of two long sides of the casing and the leading end, which is the other end of the rod in the extending direction, onto a placing surface, the first posture being defined such that the casing stands with a first angle with respect to the placing surface, and a second posture is formed by locating the rod at the standing position and by placing one of two short sides of the casing and the leading end of the rod onto the placing surface, the second posture being defined such that the casing stands with a second angle with respect to the placing surface.

According to the embodiment of the present invention, the rod can easily be moved to the falling-down position and to the standing position without using a tool such a driver, whereby the usability of the image display apparatus can be enhanced.

The first posture and the second posture of the casing can be formed by placing the leading end of the rod, which is defined as the standing position, and the side of the casing on the placing surface. Therefore, the degree of freedom in enjoying the image can be enhanced, which is advantageous in enhancing practical value of the image display apparatus.

Since the stand is formed of the rod, the appearance of the stand is good, and the appearance property of the image display apparatus can be enhanced.

BRIEF DESCRIPTION OF THE DRAWINGS

Embodiments of the present invention will be described in detail based on the following figures, wherein:

FIG. 6A is a view seen from an arrow C in FIG. 4;

FIG. 6B is a view seen from an arrow D in FIG. 4;

FIG. 7 is a backside view of the image display apparatus;

DETAILED DESCRIPTION OF THE PREFERRED EMBODIMENTS

An embodiment of the present invention will be described with reference to the drawings.

Figure 1:
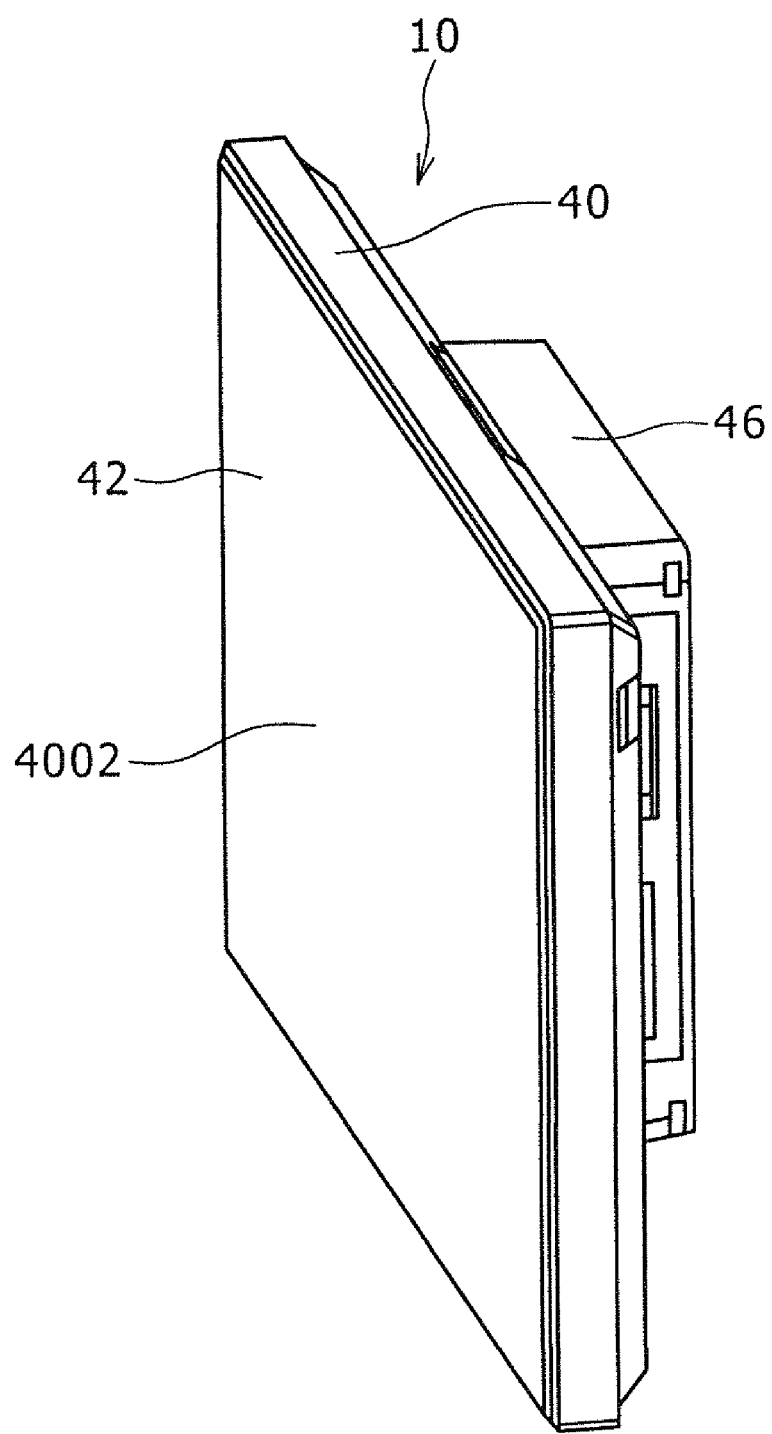
FIG. 1 is a perspective view of an image display apparatus viewed from the front.
Figure 2:
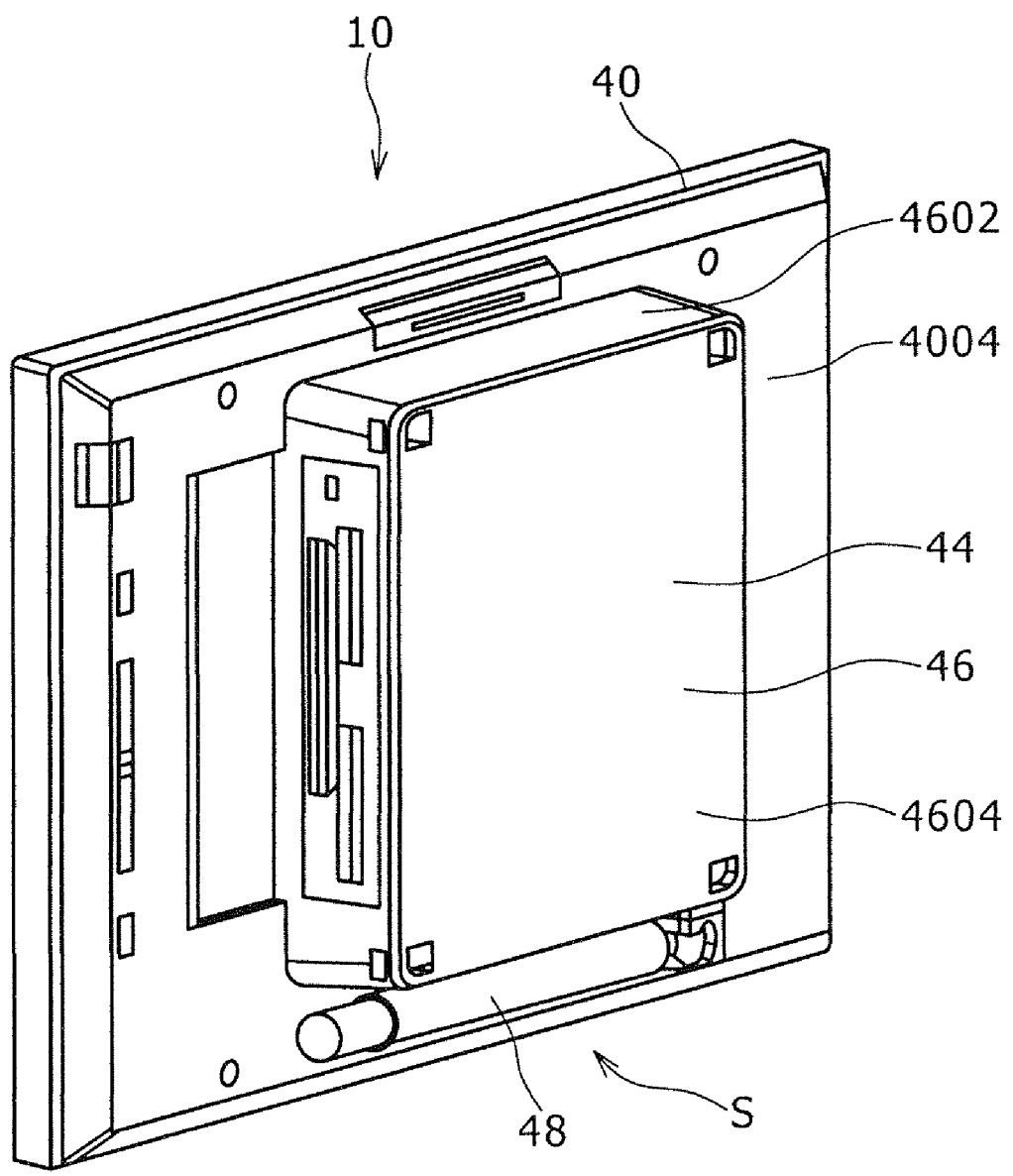
FIG. 2 is a perspective view of the image display apparatus viewed from the rear.

As shown in FIGS. 1 and 2, an image display apparatus 10 includes a casing 40, a display surface 42, a stand S, an image display section 44, and the like.

Figure 8:
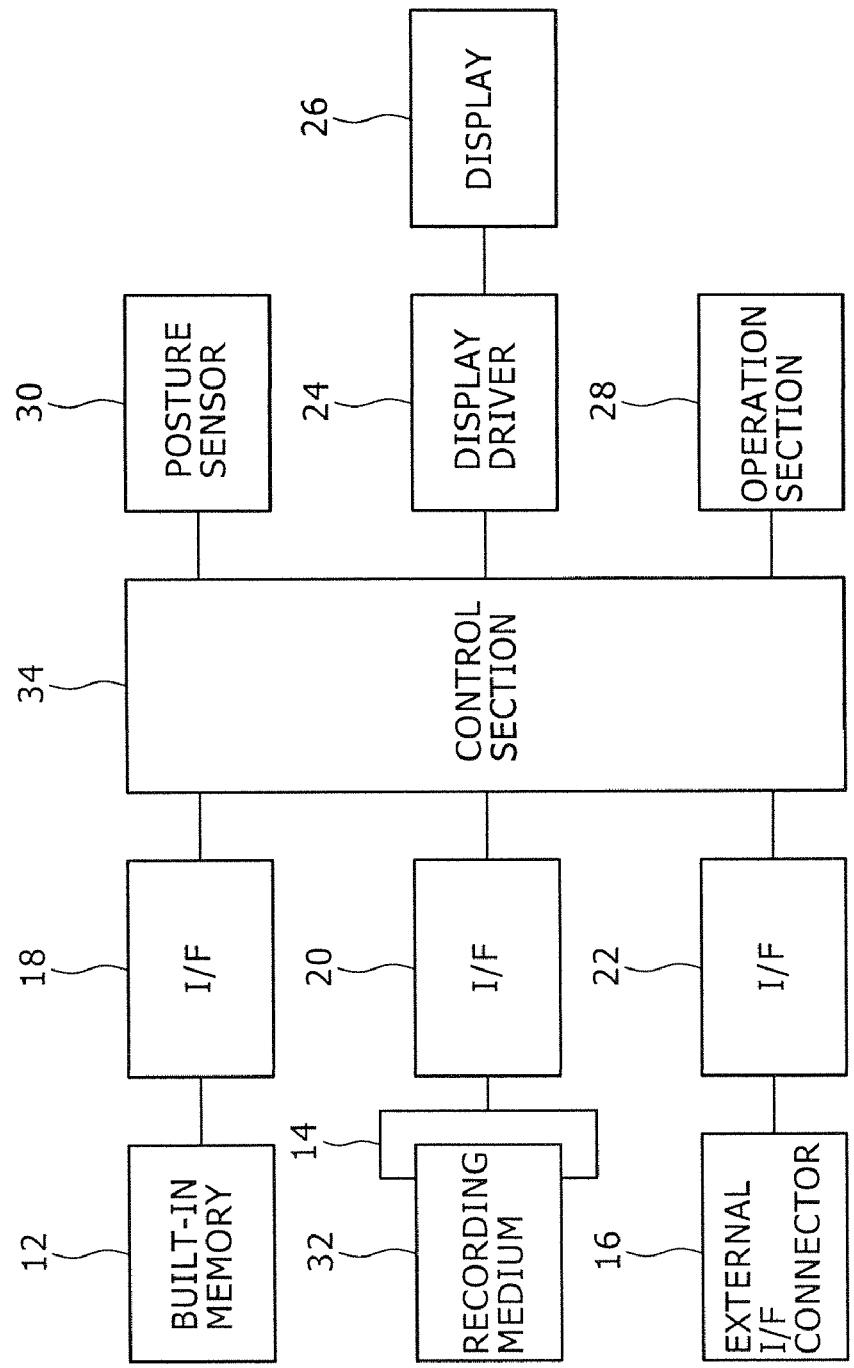
FIG. 8 is a block diagram showing a configuration of a control system of the image display apparatus.

A control system of the image display apparatus 10 will firstly be described. As shown in FIG. 8, the image display apparatus 10 includes a built-in memory 12, a connector 14 for a recording medium, an external interface connector 16, interfaces 18, 20 and 22, a display driver 24, a display 26, an operation section 28, a posture sensor 30, a control section 34, and the like.

The built-in memory 12 is made of a rewritable recording medium such as a flash EEPROM, whereby image data can be written to or read from the built-in memory 12 through the interface 18 by the control section 34.

The connector 14 for a recording medium has attached thereto a recording medium 32 having portability such as a memory card.

The recording medium 32 is attached to the connector 14 for a recording medium, whereby the image data can be written to or read from the recording medium 32 through the interface 20 by the control section 34.

When the external interface connector 16 is connected to an external electronic device such as a personal computer or a digital still camera, it receives or sends image data. In the present embodiment, plural external interface connectors 16 are mounted as shown in FIG. 6.

The external electronic device connected to the external interface connector 16 receives and sends image data from and to the control section 34 through the interface 22 on the basis of a predetermined interface standard. Various connectors, such as an USB connector, an HDMI connector, or the like, which have been known in the past, can be employed as the external interface connectors 16 performing the predetermined interface standard.

The display driver 24 drives the display 26 on the basis of the control of the control section 34 so as to allow the display 26 to display the image.

The display 26 forms the display surface 42. It displays an image on the basis of image data. Various displays, such as a liquid crystal display panel, an organic EL display, or the like, which have been known in the past, can be employed as the display 26.

Figure 3:
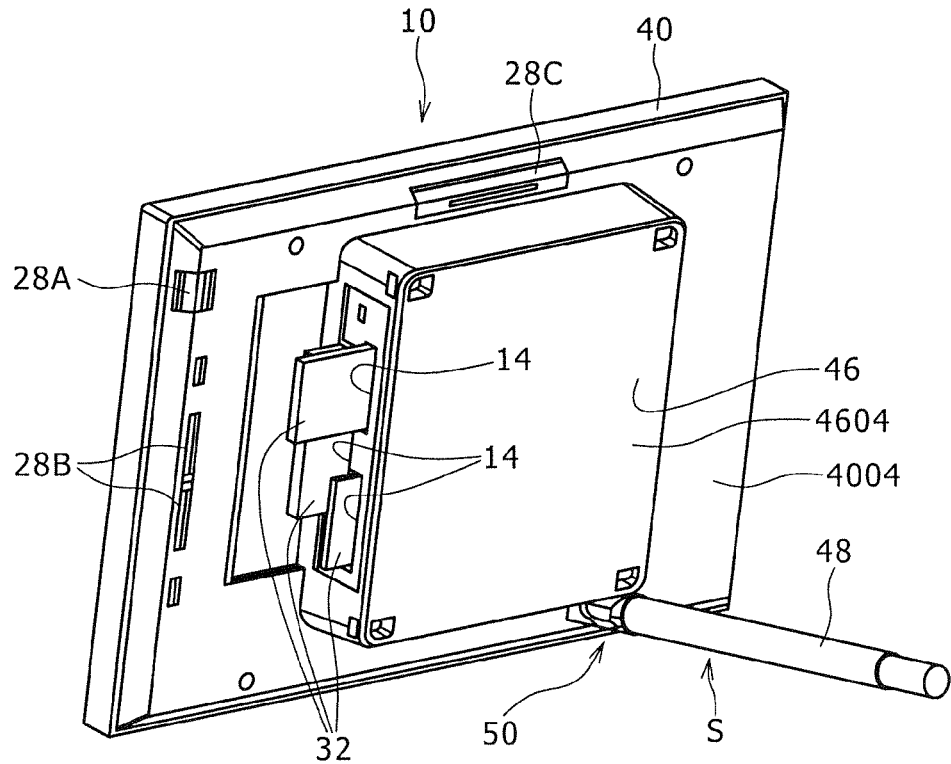
FIG. 3 is a perspective view of the image display apparatus viewed from the rear.

The operation section 28 includes plural switches for performing various operations. The plural switches include, for example, a power switch 28A, a brightness adjusting switch 28B for adjusting brightness of the display surface of the display 26, and a changeover switch 28C for changing an image display mode, as shown in FIG. 3.

When the operation section 28 is operated, it supplies an operation signal to the control section 34. The control section 34 performs a control operation according to the operation signal.

The posture sensor 30 detects the direction of gravity.

The control section 34 is composed of a microcomputer having an interface circuit, a RAM, a ROM, and the like connected to a CPU via a bus. When the CPU executes a control program stored in the ROM, the control section 34 controls the built-in memory 12, the recording medium 32, the external electronic device, the display 26, and the like.

The control section 34 also determines the vertical direction of the image that is to be displayed onto the display 26 on the basis of the result of the detection of the posture sensor 30.

The control section 34 controls the display driver 24 on the basis of the image data read from the built-in memory 12 or the recording medium 32 that is attached to the connector 14 for a recording medium so as to display the image onto the display 26, or controls the display driver 24 on the basis of the image data supplied from the external electronic device through the external interface connector 16 so as to display the image onto the display 26.

In the present embodiment, the display driver 24 and the control section 34 forms the image display section 44.

Next, the main part of the image display apparatus according to the embodiment of the present invention will be described.

Figure 4:
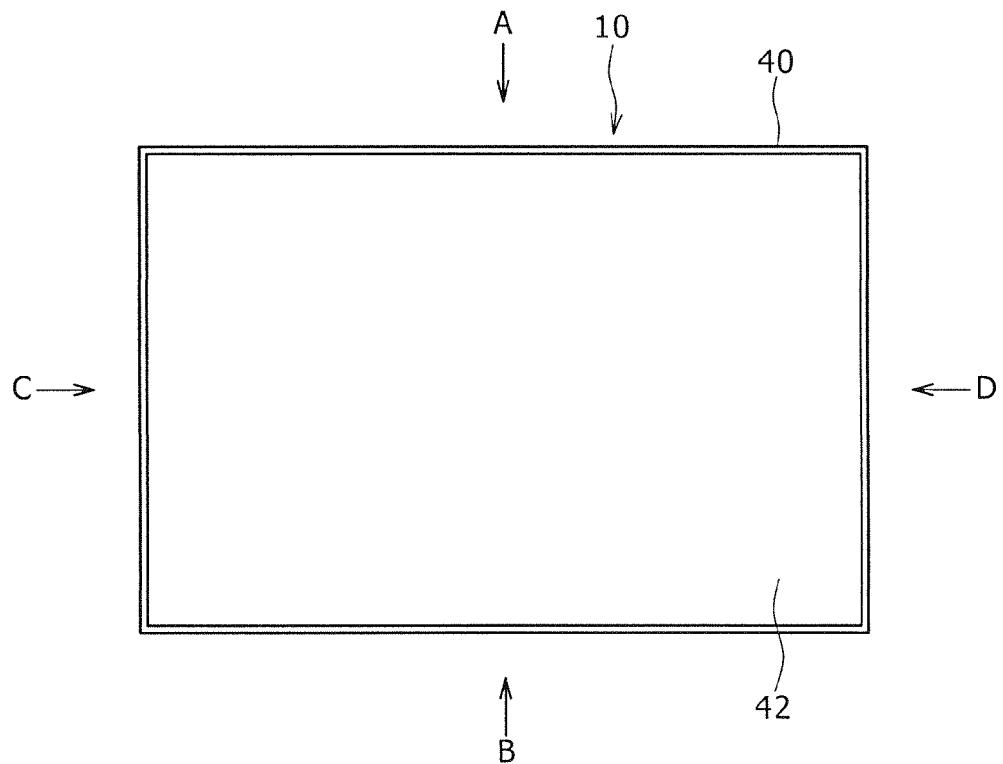
FIG. 4 is a front view of the image display apparatus.
Figure 5A:
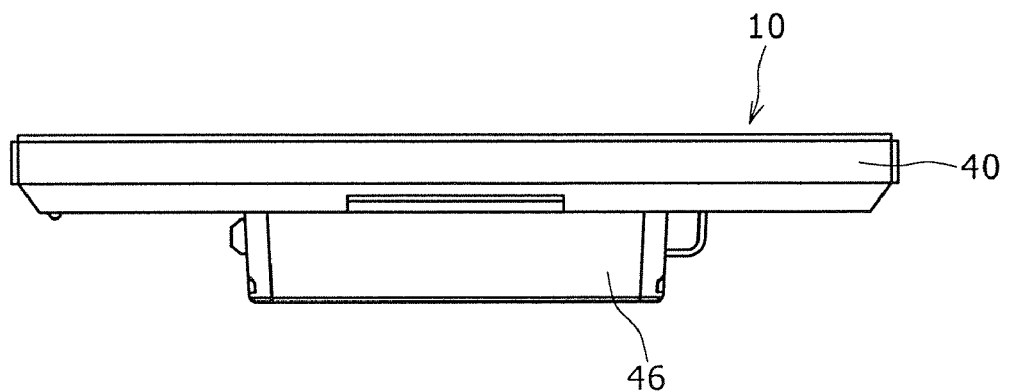
FIG. 5A is a view seen from an arrow A in FIG. 4.
Figure 5B:
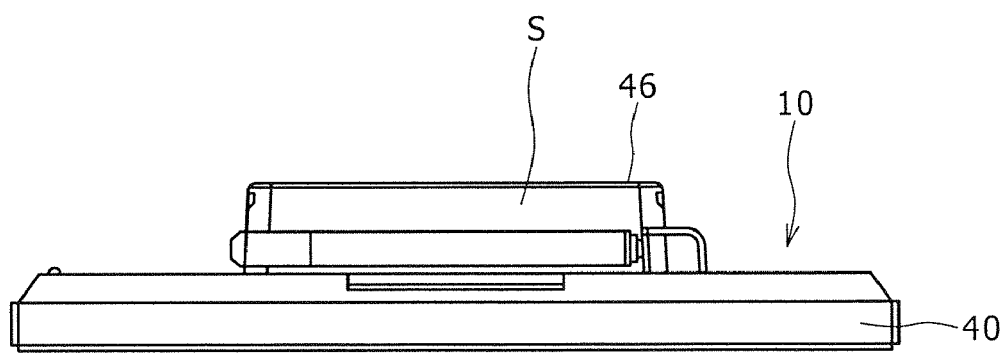
FIG. 5B is a view seen from an arrow B in FIG. 4.

FIG. 1 is a perspective view of the image display apparatus 10 viewed from the front, FIGS. 2 and 3 are perspective views of the image display apparatus 10 viewed from the rear, FIG. 4 is a front view of the image display apparatus 10, FIG. 5A is a view seen from an arrow A in FIG. 4, FIG. 5B is a view seen from an arrow B in FIG. 4, FIG. 6A is a view seen from an arrow C in FIG. 4, FIG. 6B is a view seen from an arrow D in FIG. 4, and FIG. 7 is a backside view of the image display apparatus 10.

As shown in FIGS. 1 and 2, the casing 40 has a flat rectangular plate-like shape.

The display surface 42 is formed on a front surface 4002 that is one surface in the thickness direction of the casing 40.

The stand S is provided on a rear surface 4004 that is the other surface in the thickness direction of the casing 40.

As shown in FIGS. 2 and 7, the rear surface 4004 is formed with a square plate-like housing section 46 having an outline smaller than the outline of the rear surface 4004. The housing section 46 projects from the rear surface 4004. The image display section 44 is housed in the housing section 46.

The housing section 46 has four side faces 4602 that erect from the rear surface 4004 and extend as being parallel to two long sides and two short sides of the casing 40 respectively, and a rear surface 4604 that connects the trailing ends of the four side faces 4602. The rear surface 4004 of the casing 40 and the rear surface 4604 of the housing section 46 are parallel to each other.

As shown in FIGS. 3 and 6, the plural connectors 14 for a recording medium, the plural external interface connectors 16, a connector 17 for a power supply cable are provided to the side faces 4602 of the housing section 46 parallel to the short sides of the casing 40.

As shown in FIG. 3, the stand S is made of a single rod 48.

A link mechanism 50 that links the rear surface 4004 of the casing 40 and the rod 48 is mounted.

The link mechanism 50 links the rod 48 and the portion of the rear surface 4004. The link mechanism 50 supports the rod 48 so as to be pivotal between a falling-down position (FIG. 2) where the rod 48 falls down on the rear surface 4004 and a standing position (FIG. 3) where the rod 48 stands from the rear surface 4004. The link mechanism 50 further locks and holds the rod 48 at the falling-down position and the standing position.

As shown in FIG. 6C and FIG. 7, the rod 48 extends along the side face 4602 of the housing section 46 that is parallel to the long side of the casing 40 as being in proximate thereto at the portion forward from the rear surface 4604 of the housing section 46, whereby the rod 48 is positioned in the outline of the rear surface 4004 as viewed from the rear of the rear surface 4004 of the casing 40.

Figure 9A:
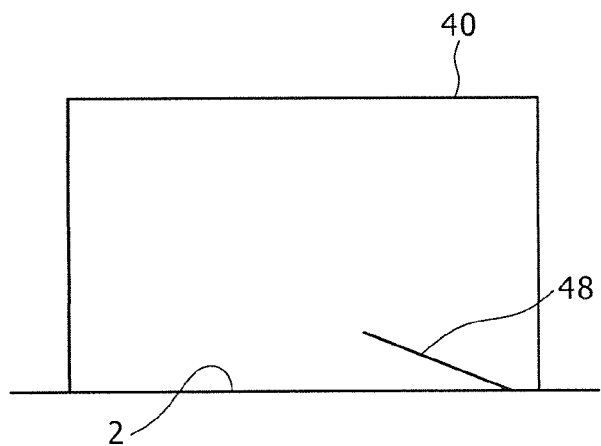
FIGS. 9A and 9B are explanatory views showing a first posture of a casing.
Figure 9B:
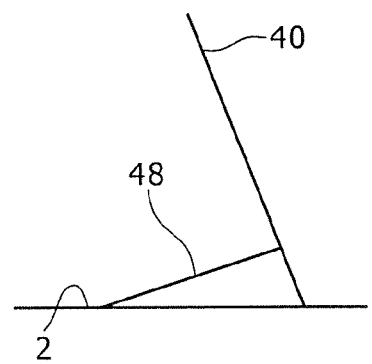

As shown in FIGS. 9A and 9B, when the rod 48 is positioned at the standing position, and one of two long sides of the casing 40 and the leading end of the rod 48 are placed onto a placing surface 2, a first posture is formed in which the casing 40 stands with a first angle with respect to the placing surface 2.

Figure 10A:
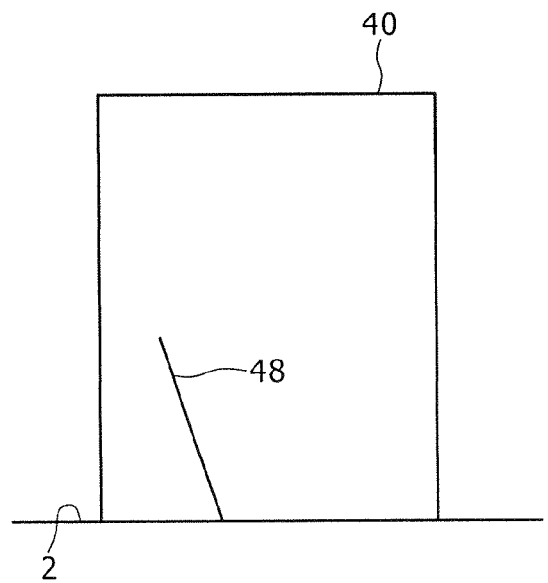
FIGS. 10A and 10B are explanatory views showing a second posture of the casing.
Figure 10B:
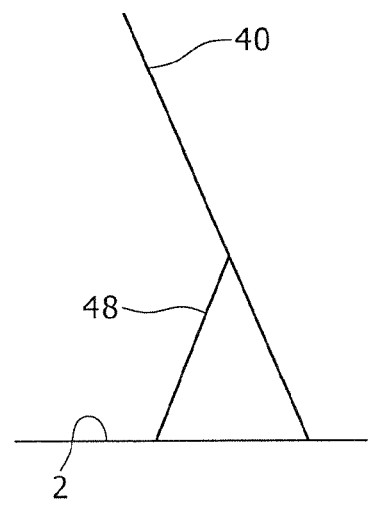

As shown in FIGS. 10A and 10B, when the rod 48 is positioned at the standing position, and one of two short sides of the casing 40 and the leading end of the rod 48 are placed onto the placing surface 2, a second posture is formed in which the casing 40 stands with a second angle with respect to the placing surface 2.

In the present embodiment, the first angle and the second angle are the same.

Figure 11:
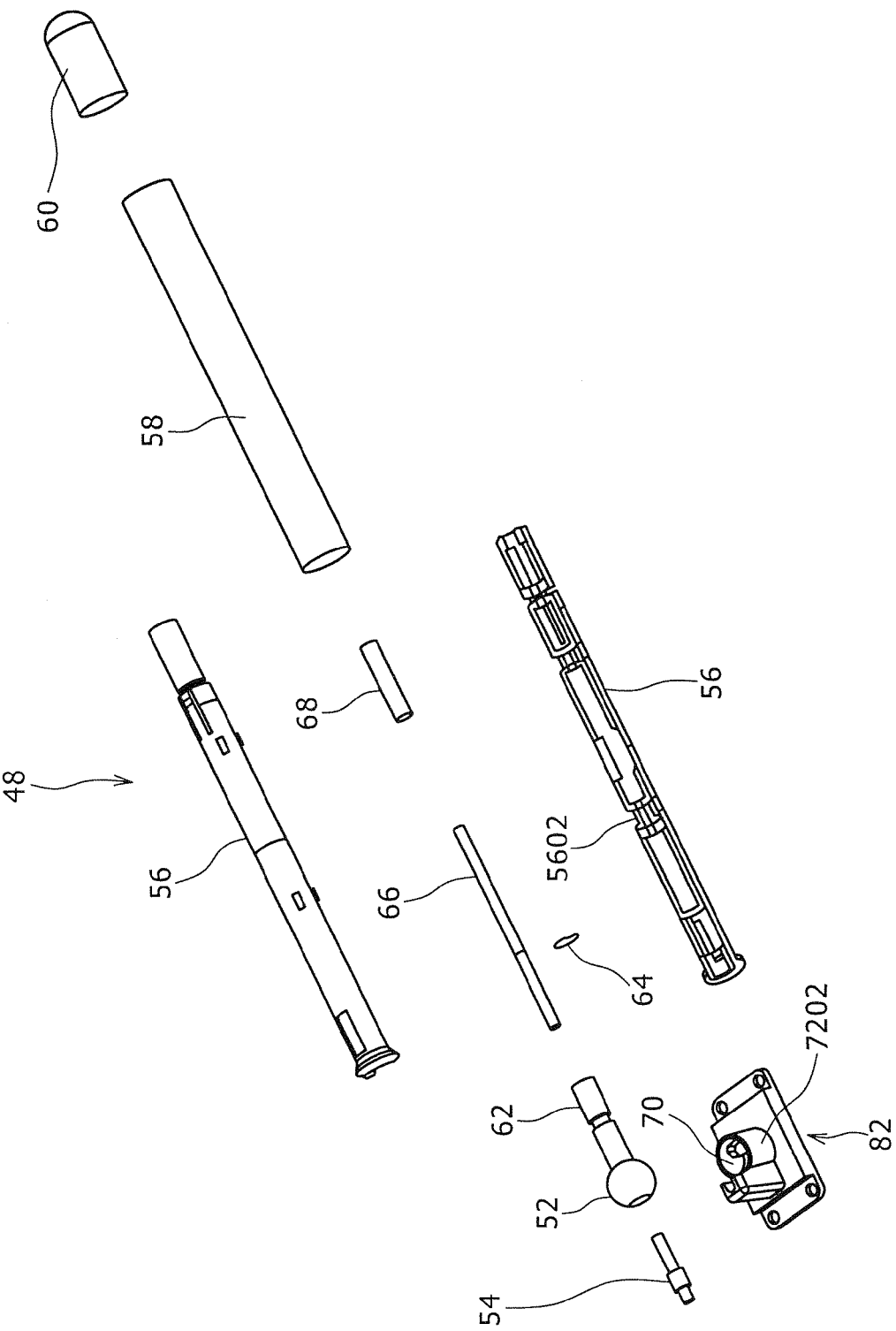
FIG. 11 is an exploded perspective view of a stand.
Figure 12:
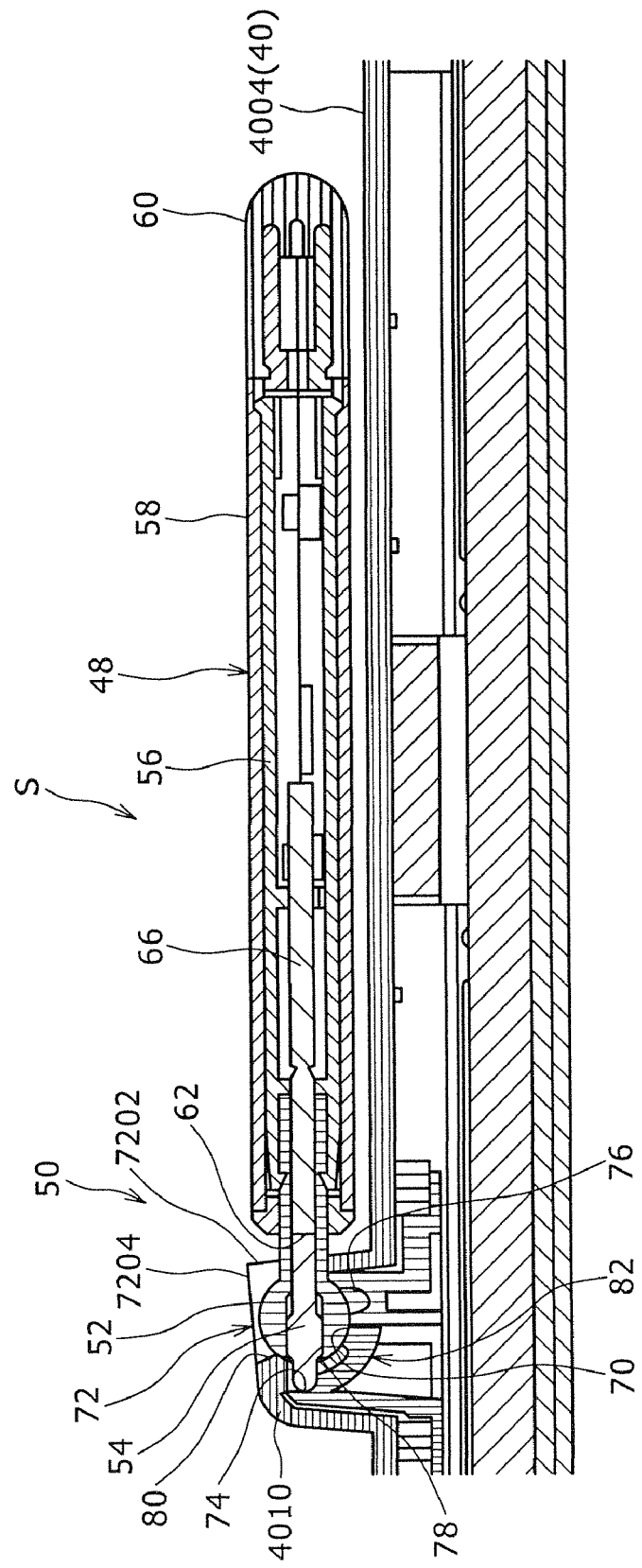
FIG. 12 is a sectional view of the stand.
Figure 13:
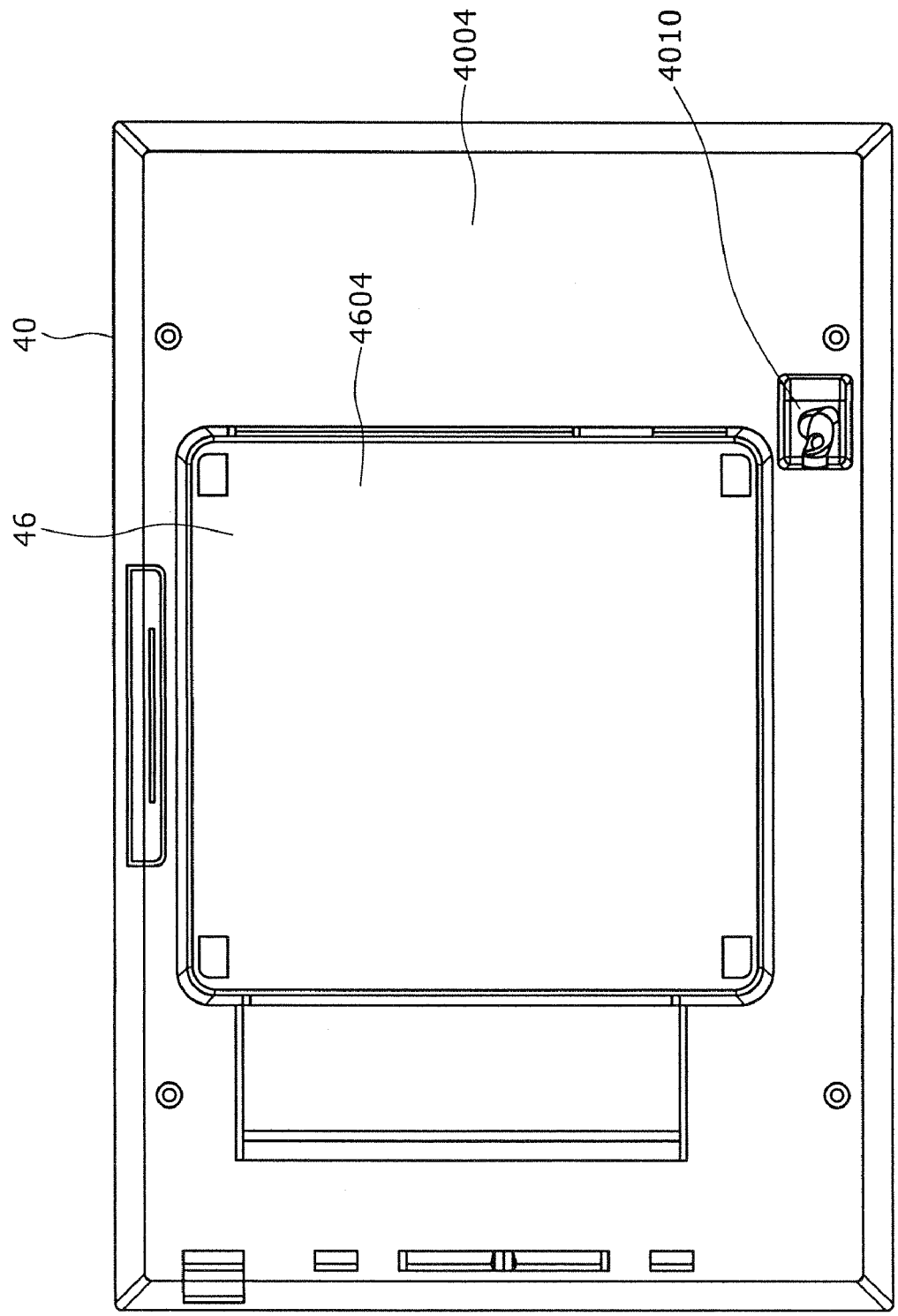
FIG. 13 is an explanatory view showing a state in which a rod is removed from a rear surface of the casing.
Figure 14:
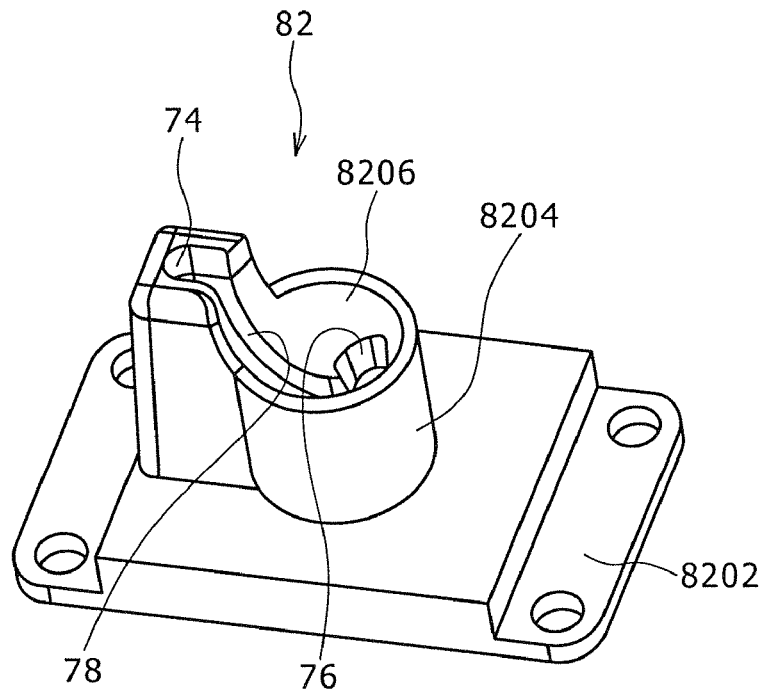
FIG. 14 is a perspective view of a spherical space forming member.
Figure 15:
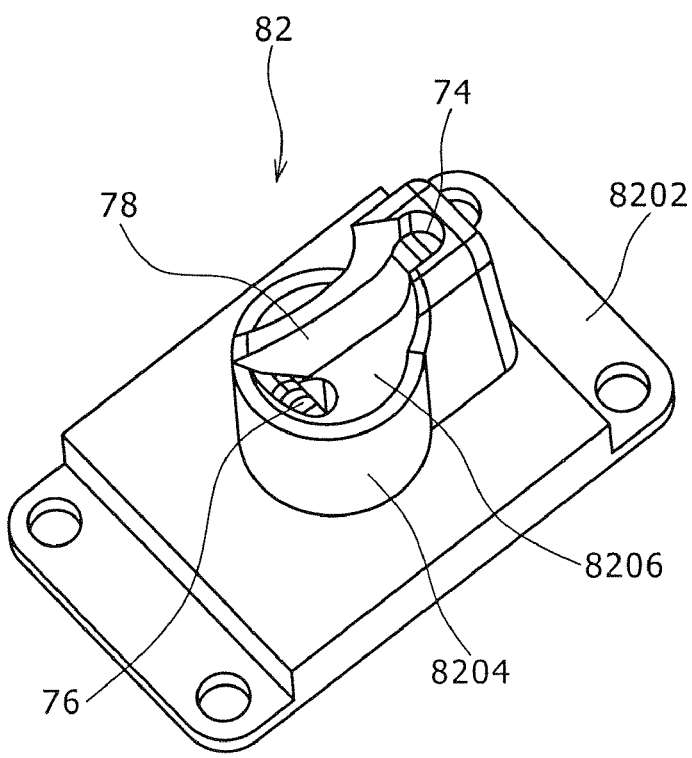
FIG. 15 is a perspective view of the spherical space forming member.
Figure 16:
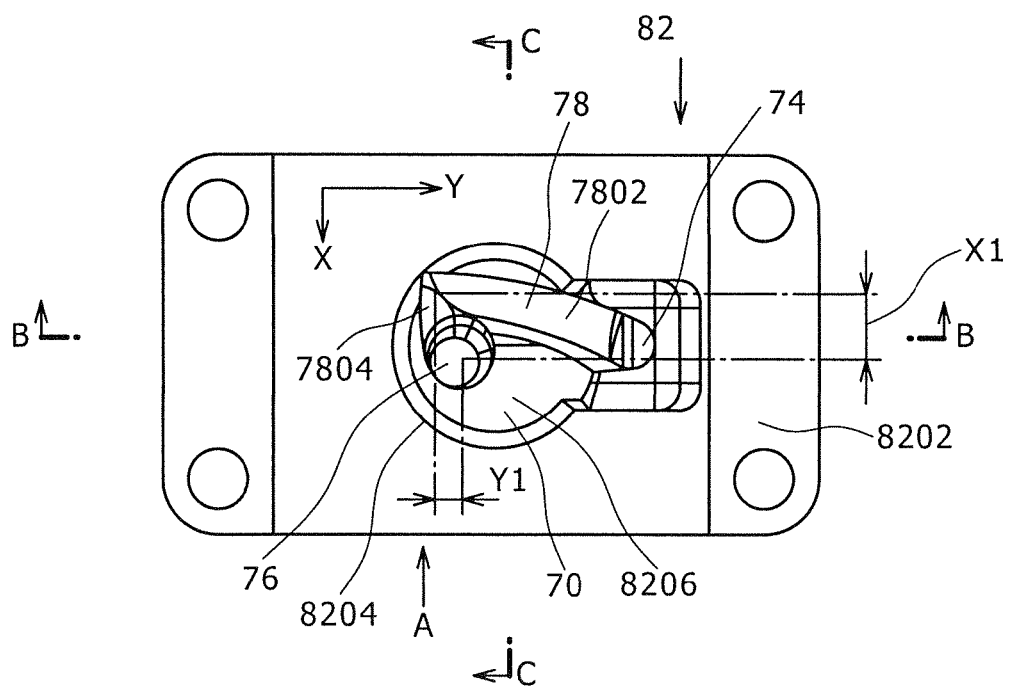
FIG. 16 is a plan view of the spherical space forming member.
Figure 17:
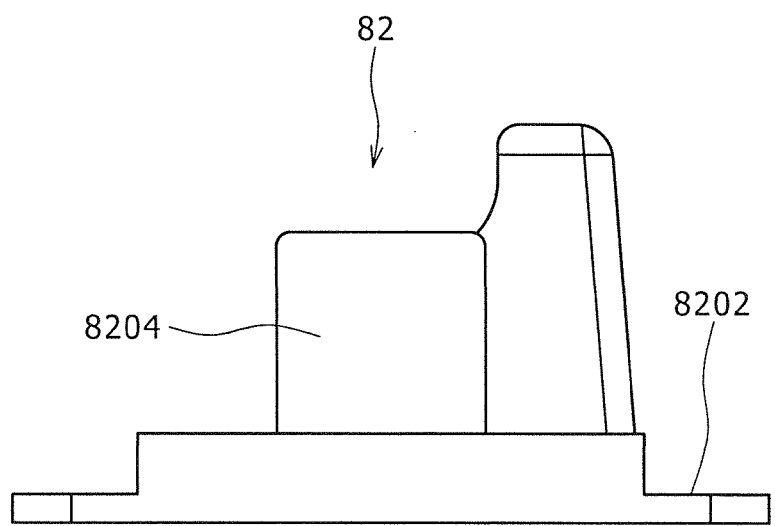
FIG. 17 is a view seen from an arrow A in FIG. 16.
Figure 18:
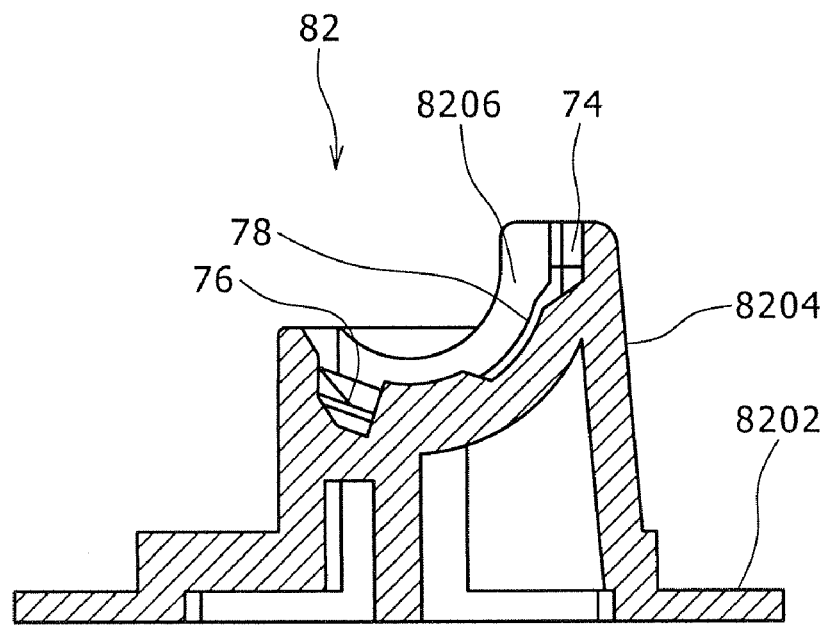
FIG. 18 is a sectional view taken along a line B-B in FIG. 16.
Figure 19:
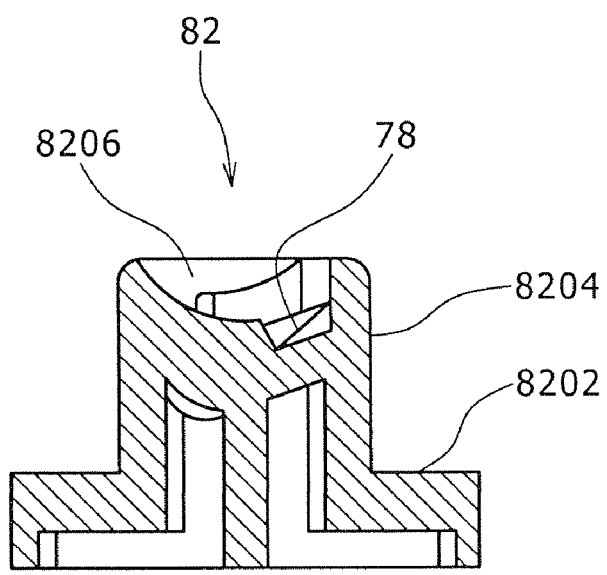
FIG. 19 is a sectional view taken along a line C-C in FIG. 16.

FIG. 11 is an exploded perspective view of the stand S, FIG. 12 is a sectional view of the stand S, FIG. 13 is an explanatory view showing a state in which the rod 48 is removed from the rear surface 4004 of the casing 40, FIGS. 14 and 15 are perspective views of a spherical space forming member 82, FIG. 16 is a plan view of the spherical space forming member 82, FIG. 17 is a view seen from an arrow A in FIG. 16, FIG. 18 is a sectional view taken along a line B-B in FIG. 16, and FIG. 19 is a sectional view taken along a line C-C in FIG. 16.

As shown in FIG. 12, the rod 48 has a spherical sphere member 52 at its base end that is one end in the extending direction.

A cam pin 54, which can advance to or retreat from the extension line of the axis of the rod 48 and is typically biased in the projecting direction, is mounted to the portion of the sphere member 52 apart from the rod 48.

Explained in detail, the rod 48 includes two semi-cylindrical inner divided cylinders 56, a cylindrical outer cylinder 58, a cap 60 that forms the leading end of the rod 48, and the like, as shown in FIG. 11.

The sphere member 52 is mounted to an end portion of a cylindrical axis 62. The cam pin 54 is inserted into a center hole of the sphere member 52 and the cylindrical axis 62 so as to be movable in the axis direction.

The cylindrical axis 62 is held and fixed at the leading ends of two inner divided cylinders 56.

An axis 66 to which an E ring 64 is attached to the middle part in the lengthwise direction is inserted into the divided cylinders 56 so as to be movable in the axis direction, and a coil spring 68 wound around the axis 66 is locked to the E ring 64 and wall portions 5602 of the inner divided cylinders 56, whereby the axis 66 is biased toward the sphere member 52, and the leading end of the axis 66 abuts the base end of the cam pin 54. By virtue of this structure, the cam pin 54 is typically biased toward the projecting direction.

The two inner divided cylinders 56 having the sphere member 52, the cylindrical axis 62, the axis 66 and the coil spring 68 mounted thereto is inserted into the outer cylinder 58.

The outer cylinder 58 is made of metal. The cap 60 is attached to the end portion of the outer cylinder 58. The cap 60 is made of a material having a large friction coefficient, such as a rubber or elastomer.

Accordingly, the sphere member 52 is positioned at the base end of the rod 48, and the cap 60 is positioned at the leading end.

As shown in FIG. 12, a projecting wall section 72, which projects rearward from the rear surface 4004 and has therein a spherical space 70 with which the sphere member 52 is engaged so as not to fall off, is formed at the rear surface 4004 of the casing 40.

The projecting wall section 72 has a side wall 7202 erecting from the rear surface 4004 and a rear wall 7204 jointing the trailing end of the side wall 7202.

The wall surface forming the spherical space 70 is formed with an engagement concave portion for the falling-down position 74 with which the cam pin 54 is engaged at the falling-down position and an engagement concave portion for the standing position 76 with which the cam pin 54 is engaged at the standing position.

As shown in FIG. 16, the wall surface forming the spherical space 70 is formed with a cam groove 78. The cam groove 78 is formed so as to have a depth shallower than the engagement concave portion for the falling-down position 74 and the engagement concave portion for the standing position 76, and joints the engagement concave portion for the falling-down position 74 and the engagement concave portion for the standing position 76 so as to guide the cam pin 54 to the engagement concave portion for the falling-down position 74 and the engagement concave portion for the standing position 76.

The cam groove 78 extends in an L shape. The engagement concave portion for the falling-down position 74 and the engagement concave portion for the standing position 76 are positioned at both ends of the cam groove 78 in the extending direction.

Explained in more detail, the cam groove 78 is formed into an L-shape having a first groove portion 7802 and a second groove portion 7804 that is connected to one end of the first groove portion 7802 in the extending direction and extends in the direction of crossing the first groove portion 7802 from one end with an acute angle with respect to the extending direction of the first groove portion 7802 with a length shorter than the extending length of the first groove portion 7802.

The engagement concave portion for the falling-down position 74 is formed at the other end in the extending direction of the first groove portion 7802, while the engagement concave portion for the standing position 76 is formed at the end of the second groove 7804 at the side apart from the one end of the first groove 7802.

Figure 22:
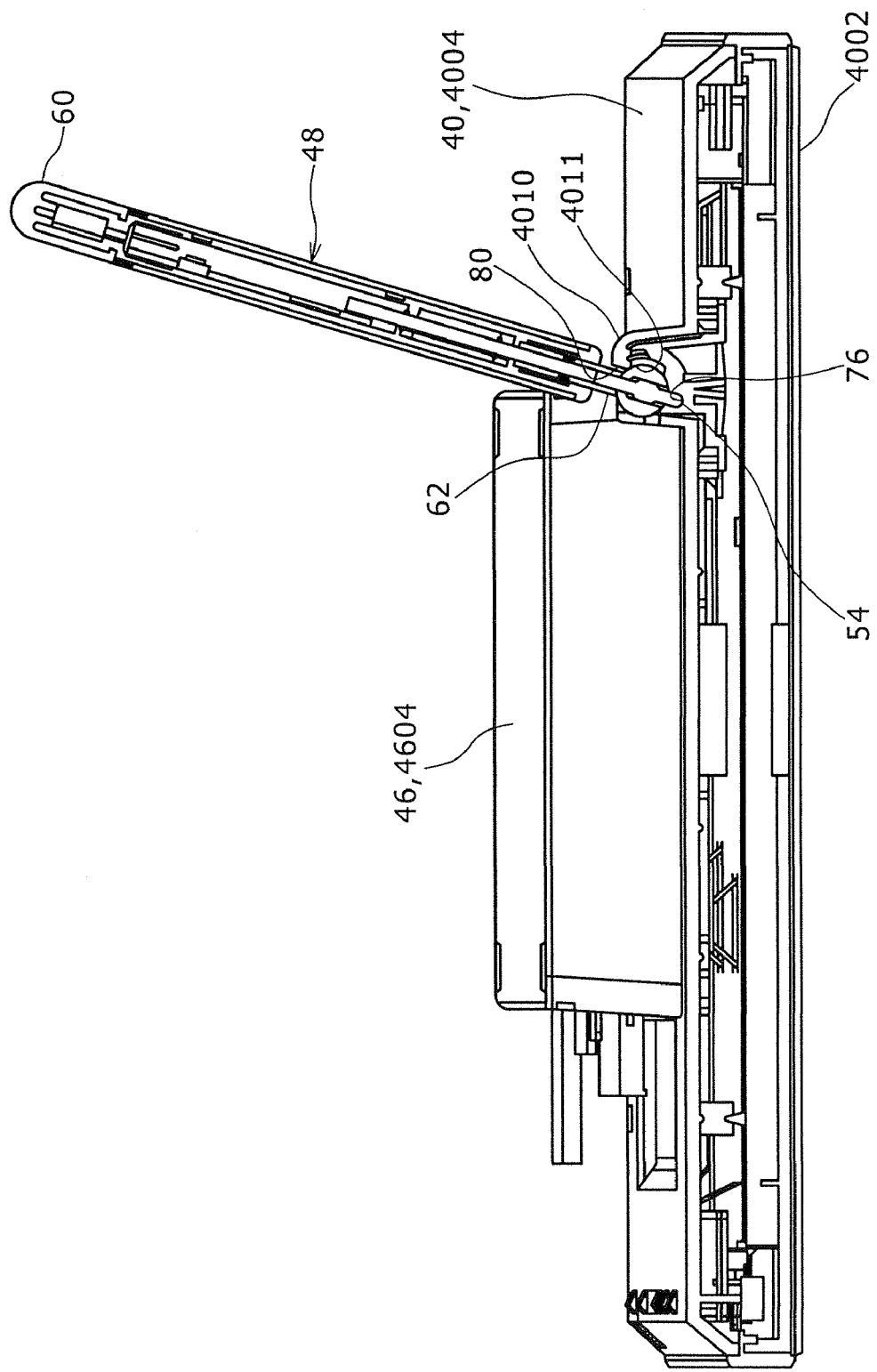
FIG. 22 is an explanatory view showing a standing state of the rod.

The spherical space 70 is formed at the outside of the projecting wall section 72 in an open fashion by a cutout portion 80 that extends from the rear wall 7204 toward the side wall 7202 as shown in FIG. 12. As shown in FIG. 22, the edge of the cutout portion 80 is locked to the rod 48 (cylindrical axis 62) in the standing position, whereby the casing 40 is prevented from falling down.

In the present embodiment, the projecting wall section 72 includes a wall 4010 integrally formed with the rear surface 4004 of the casing 40 and a spherical space forming member 82 mounted to the rear surface 4004 of the casing 40 from front of the casing 40 as shown in FIGS. 12 and 13.

As shown in FIGS. 14 to 19, the spherical space forming member 82 has a mounting plate section 8202 mounted to the rear surface 4004 and a projecting section 8204 mounted to the mounting plate section 8202.

The projecting section 8204 is formed with a concave portion 8206 that forms almost a first half part of the spherical space 70. The engagement concave portion for the falling-down position 74, the engagement concave portion for the standing position 76, and the cam groove 78 are provided to the wall surface of the concave portion 8206.

As shown in FIG. 22, the wall portion 4010 is formed with a concave portion 4011 that forms almost a second half part of the spherical space 70. The cutout portion 80 is formed at the wall section 4010 forming the concave portion 4011.

The rod 48 is assembled to the rear surface 4004 as described below. Specifically, the sphere member 52 is inserted into the concave portion 4011 at the wall surface 4010 from the front of the rear surface 4004, and the mounting plate section 8202 of the spherical space forming member 82 is attached to the rear surface 4004 with a screw so as to house the sphere member 52 into the concave portion 8206. Thus, the sphere member 52 is supported by the spherical surface of the spherical space 70 so as to be movable along the spherical surface of the spherical space 70.

After the sphere member 52 is installed to the rear surface 4004, the two inner divided cylinders 56 having the axis 66 and the coil spring 68 attached thereto is mounted to the cylindrical axis 62. Then, the outer cylinder 58 having the cap 60 mounted thereto is attached to the outside of the cylinder axis 68. Thus, the rod 48 is mounted to the rear surface 4004.

In the present embodiment, the link mechanism 50 is adapted to include the sphere member 52, the cam pin 54, the projecting wall section 72, the spherical space 70, the engagement concave portion for the falling-down position 74, the engagement concave portion for the standing position 76, and the cam groove 78.

The method of using the stand S will next be described.

Figure 20:
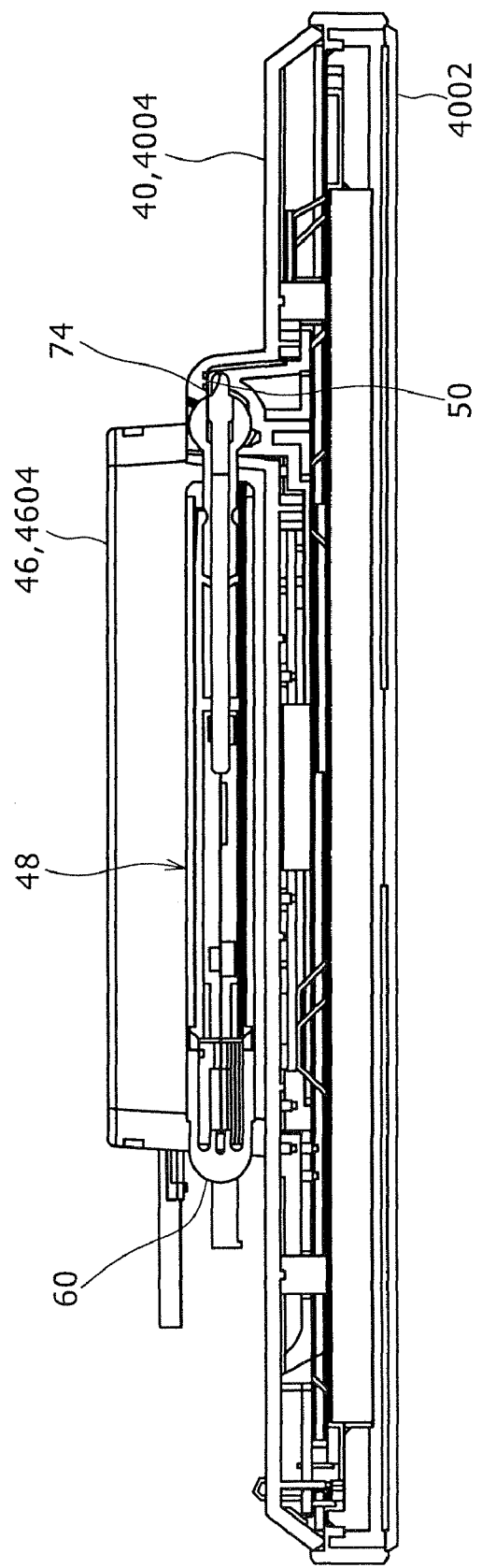
FIG. 20 is an explanatory view showing a falling-down state of the rod.

As shown in FIG. 20, it is supposed that the rod 48 is located beforehand at the falling-down position.

When the rod 48 moves in the direction apart from the rear surface 4004 with this state, the engagement of the cam pin 54 with the engagement concave portion for the falling-down position 74 is released with the pivot movement of the rod 48.

Figure 21:
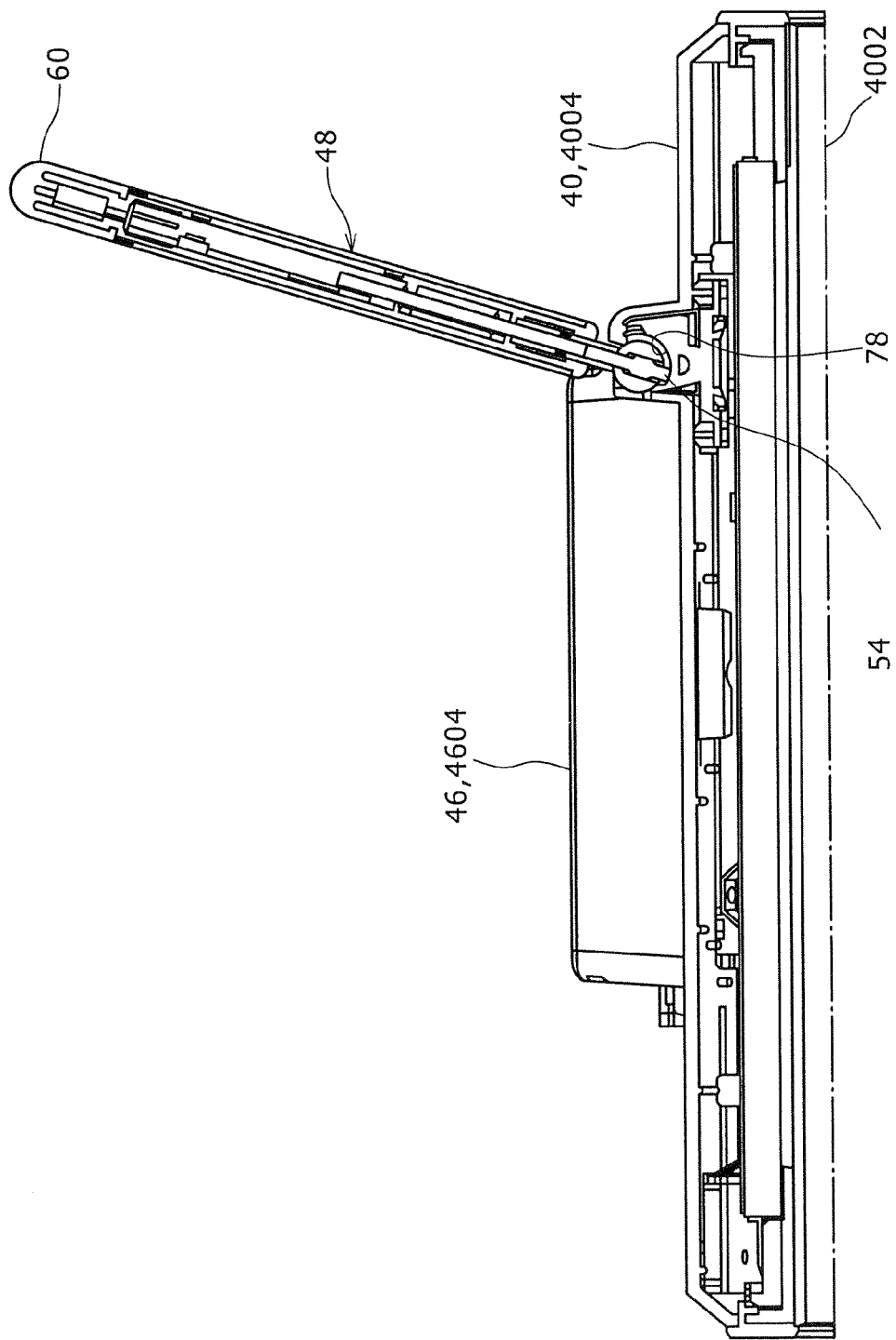
FIG. 21 is an explanatory view showing a moving state of the rod.

When the rod 48 is moved in the standing direction, the cam pin 54 moves in the direction apart from the engagement concave portion for the falling-down position 74 as being guided by the cam groove 78 with the pivot movement of the rod 48 as shown in FIG. 21.

In this case, when the cam pin 54 reaches the bent portion of the L-shaped cam groove 78, the direction of the pivot movement of the rod 48 is changed, whereby the cam pin 54 moves in the direction of the engagement concave portion for the standing position 76 in the cam groove 78.

The cam pin 54 is engaged with the engagement concave portion for the standing position 76 to allow the rod 48 to locate on the standing position, and the rod 48 is locked and held at the standing position by the engagement of the cam pin 54 with the engagement concave portion for the standing position 76.

In the present embodiment, the cam groove 78 is formed into an L shape by the first groove portion 7802 and the second groove portion 7804 that crosses the first groove portion 7802 with the acute angle, and the engagement concave portion for the standing position 76 is formed at the end of the second groove portion 7804. Therefore, as shown in FIG. 16, when the direction of the long side of the casing 40 is defined as an X direction and the direction of the short side is defined as a Y direction, the rod 48 overhangs in the Y direction by a distance Y1 from the crossing section of the first groove position 7802 and the second groove portion 7804 and overhangs in the X direction by a distance X1 at the standing position of the rod 48. Accordingly, even if force in the direction of disengaging the cam pin 54 from the engagement concave portion for the standing position 76 is applied to the cam pin 54, the configuration is advantageous for keeping the standing position of the rod 48.

Consequently, the first posture and the second posture of the casing 40 can advantageously be maintained with the leading end of the rod 48 defined as the standing position placed on the placing surface 2 together with the long side or the short side of the casing 40.

As described above, when the rod 48 is located at the standing position, and as shown in FIGS. 3, 9A, and 9B, one of two long sides of the casing 40 and the leading end (cap 60) of the rod 48 are placed onto the placing surface 2, the first posture is formed in which the casing 40 stands with the first angle with respect to the placing surface 2.

As shown in FIGS. 10A and 10B, when the rod 48 is located at the standing position, and one of two short sides of the casing 40 and the leading end (cap 60) of the rod 48 are placed onto the placing surface 2, the second posture is formed in which the casing 40 stands with the second angle (in the present embodiment, the first angle and the second angle are the same) with respect to the placing surface 2.

At the standing position, the edge of the cutout portion 80 is locked to the rod 48 so as to prevent the casing 40 from falling down as shown in FIG. 22. Thus, the load applied to the cam pin 54 and the engagement concave portion for the standing position 76 is reduced upon the first and the second postures of the casing 40, which is advantageous in enhancing durability of the cam pin 54 and the engagement concave portion for the standing position 76.

When the rod 48 falls down to the falling-down position from the standing position for housing, the rod 48 may pivot to fall down with the cam pin 54 moving along the cam groove 78. By virtue of this operation, the cam pin 54 is engaged with the engagement concave portion for the falling-down position 74, whereby the rod 48 is locked and held at the falling-down position.

Subsequently explained is a case in which the image display apparatus 10 is hung on a wall by means of a string 4.

Figure 23:
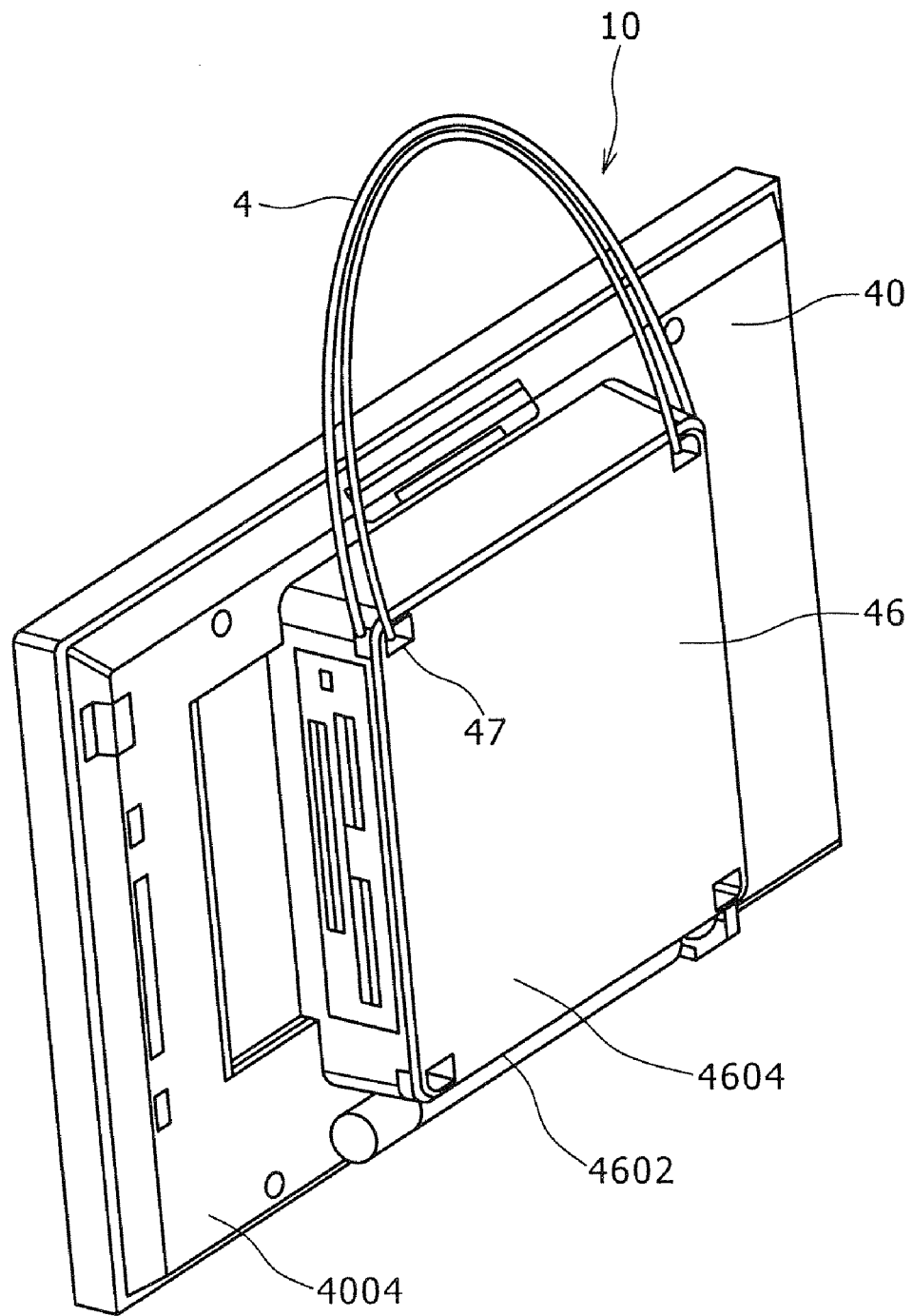
FIG. 23 is an explanatory view showing a state in which the image display apparatus is used with a string.
Figure 24:
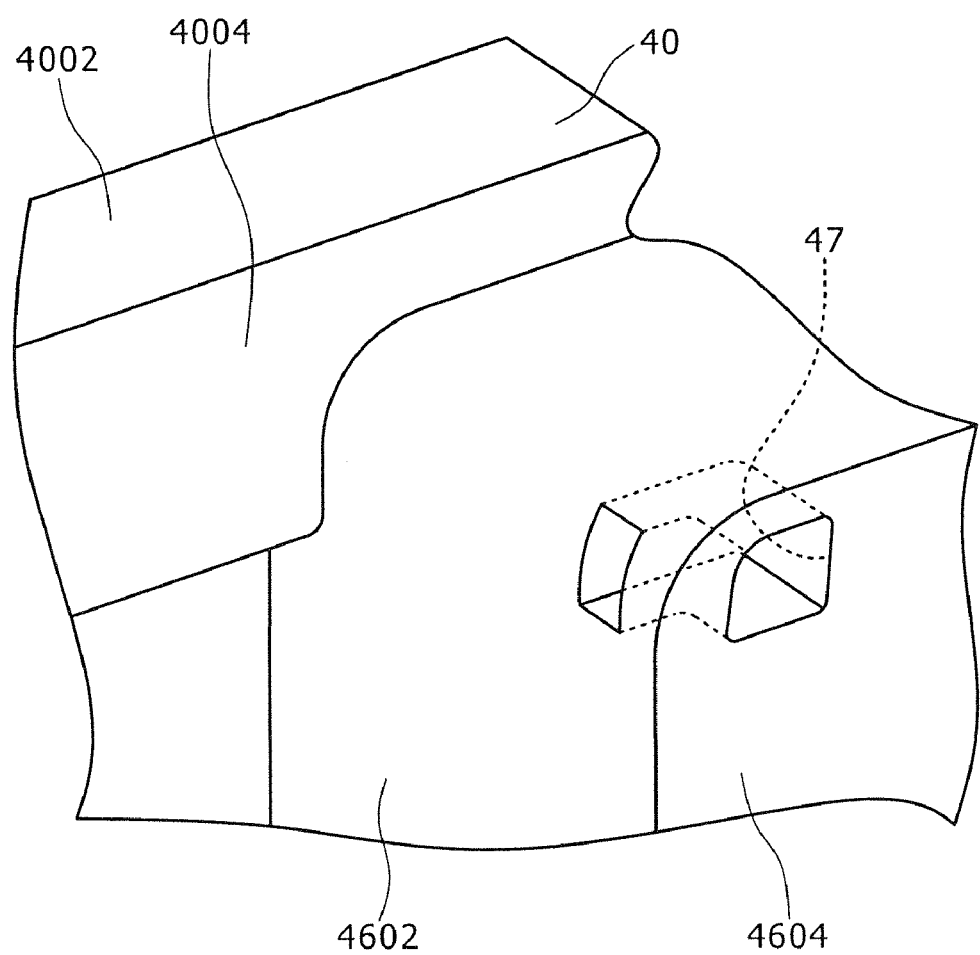
FIG. 24 is an explanatory view of a string insertion hole.

As shown in FIGS. 23 and 24, string insertion holes 47 are formed at four corners of the housing section 46. The string 4 is inserted into two of the string insertion holes 47, and the central part of the string 4 is hooked on a hook attached to the wall, for example.

In this case, the rod 48 is located at the falling-down position, and extends along the side face 4602 of the housing section 46 that is parallel to the long side of the casing 40 as being in proximate thereto at the portion forward from the rear surface 4604 of the housing section 46. Therefore, the rod 48 does not abut the wall, whereby the image display apparatus 10 can be hung on the wall with a desired angle.

When the image display apparatus 10 is hung on the wall, the rod 48 is positioned in the outline of the rear surface 4004 as viewed from the rear of the rear surface 4004 of the casing 40. Accordingly, there is no chance that a part of the rod 48 is exposed to the outside of the image display apparatus 10 by which the appearance is spoiled. Thus, this structure is advantageous in enhancing the appearance property of the image display apparatus 10 that is hung on the wall.

According to the embodiment of the present invention, the rod 48 can easily be moved to the falling-down position and to the standing position without using a tool such as a driver, whereby the usability of the image display apparatus 10 can be enhanced.

The first posture and the second posture of the casing 40 can be formed by placing the leading end of the rod 48, which is defined as the standing position, and the side of the casing 40 on the placing surface. Therefore, the degree of freedom in enjoying the image can be enhanced, which is advantageous in enhancing practical value of the image display apparatus 10.

Since the stand S is formed of the rod 48, the appearance of the stand S is good, and the appearance property of the image display apparatus 10 can be enhanced.

It should be understood by those skilled in the art that various modifications, combinations, sub-combinations and alterations may occur depending on design requirements and other factors insofar as they are within the scope of the appended claims or the equivalents thereof.

What is claimed is:

1. An image display apparatus comprising:
a flat rectangular plate-like casing;
a display surface formed on a front surface that is one surface of the casing in the thickness direction;
a stand provided to the rear surface that is the other surface of the casing in the thickness direction, the stand having a single rod; and
an image display section provided to the casing for allowing an image to be displayed onto the display surface,
wherein the single rod is positioned at two positions, a falling down position where the rod falls down on the rear surface and a standing position where the rod stands from the rear surface;
wherein a first posture is formed by locating the rod at the standing position and by placing one of two long sides of the casing and the leading end, which is the other end of the rod in the extending direction, onto a placing surface, the first posture being defined such that the casing stands with a first angle with respect to the placing surface, and
wherein a second posture is formed by locating the rod at the standing position and by placing one of two short sides of the casing and the leading end of the rod onto the placing surface, the second posture being defined such that the casing stands with a second angle with respect to the placing surface,
wherein a housing section for housing the image display section projects with an outline smaller than the rear surface, on the rear surface;
wherein the housing section stands from the rear surface and has a side face extending so as to be parallel to one of two long sides and two short sides of the casing; and
wherein the rod extends so as to be parallel to the side face of the housing section in proximate to the side face, and is positioned in the outline of the rear surface viewed from the rear of the rear surface at the falling-down position.

2. An image display apparatus comprising:
a flat rectangular plate-like casing;
a display surface formed on a front surface that is one surface of the casing in the thickness direction;
a stand provided to the rear surface that is the other surface of the casing in the thickness direction; and
an image display section provided to the casing for allowing an image to be displayed onto the display surface,
wherein, the stand is composed of a single rod linearly extending,
wherein the single rod is positioned at two positions, a falling down position where the rod falls down on the rear surface and a standing position where the rod stands from the rear surface;
wherein a first posture is formed by locating the rod at the standing position and by placing one of two long sides of the casing and the leading end, which is the other end of the rod in the extending direction, onto a placing surface, the first posture being defined such that the casing stands with a first angle with respect to the placing surface, and
wherein a second posture is formed by locating the rod at the standing position and by placing one of two short sides of the casing and the leading end of the rod onto the placing surface, the second posture being defined such that the casing stands with a second angle with respect to the placing surface,
wherein the link mechanism includes a cam groove that is engaged with a base end of the rod for guiding the rod to the falling-down position and the standing position, the cam groove including,
a first groove and a second groove crossing the first groove,
an engagement concave portion for the falling-down position formed at the other end of the first groove portion in the extending direction, the engagement concave portion for the falling-down position being engaged with the base end of the rod so as to locate the rod to the falling-down position, and
an engagement concave portion for the standing position formed at the end of the second groove portion, which is apart from the first groove portion, the engagement concave portion for the standing position being engaged with the base end of the rod so as to locate the rod to the standing position; and
wherein the second groove portion is connected to one end of the first groove portion in the extending direction, and extends in the direction of crossing the first groove portion from the one end in the extending direction with an acute angle with a length shorter than the extending length of the first groove portion, in order to form the cam groove into a substantially L shape.

3. An image display apparatus comprising:
a flat rectangular plate-like casing;
a display surface formed on a front surface that is one surface of the casing in the thickness direction;
a stand provided to the rear surface that is the other surface of the casing in the thickness direction; and
an image display section provided to the casing for allowing an image to be displayed onto the display surface,
wherein the stand is composed of a single rod linearly extending,
wherein the single rod is positioned at two positions, a falling down position where the rod falls down on the rear surface and a standing position where the rod stands from the rear surface;
wherein a first posture is formed by locating the rod at the standing position and by placing one of two long sides of the casing and the leading end, which is the other end of the rod in the extending direction, onto a placing surface, the first posture being defined such that the casing stands with a first angle with respect to the placing surface, and
wherein a second posture is formed by locating the rod at the standing position and by placing one of two short sides of the casing and the leading end of the rod onto the placing surface, the second posture being defined such that the casing stands with a second angle with respect to the placing surface,
wherein a housing section for housing the image display section projects with an outline smaller than the rear surface, on the rear surface;
wherein the housing section stands from the rear surface and has a side face extending so as to be parallel to one of two long side and two short sides of the casing; and
wherein the rod extends so as to be parallel to the side face of the housing section in proximate to the side face at the portion in front of the rear surface of the housing section, and is positioned in the outline of the rear surface viewed from the rear of the rear surface at the falling-down position.

4. An image display apparatus comprising:
a flat rectangular plate-like casing;
a display surface formed on a front surface that is one surface of the casing in the thickness direction;
a stand provided to the rear surface that is the other surface of the casing in the thickness direction; and
an image display section provided to the casing for allowing an image to be displayed onto the display surface,
wherein, the stand is composed of a single rod linearly extending,
wherein the single rod is positioned at two positions, a falling down position where the rod falls down on the rear surface and a standing position where the rod stands from the rear surface;
wherein a first posture is formed by locating the rod at the standing position and by placing one of two long sides of the casing and the leading end, which is the other end of the rod in the extending direction, onto a placing surface, the first posture being defined such that the casing stands with a first angle with respect to the placing surface, and
wherein a second posture is formed by locating the rod at the standing position and by placing one of two short sides of the casing and the leading end of the rod onto the placing surface, the second posture being defined such that the casing stands with a second angle with respect to the placing surface,
a spherical sphere member is provided at a base end which is one end of the rod in the extending direction;
a cam pin that can advance or retreat on the extension line of the axis of the rod and is typically biased in the projecting direction, is mounted to the portion of the sphere member apart from the rod;
a projecting wall portion, which projects rearward from the rear surface and has a spherical space in which the sphere member is fitted so as not to slip off therefrom, is mounted to the rear surface;
an engagement concave portion for the falling-down position with which the cam pin is engaged at the falling-down position and an engagement concave portion for the standing position with which the cam pin is engaged at the standing position are formed on the wall surface forming the spherical space;
a cam groove is formed to the wall surface forming the spherical space, the cam groove having a depth shallower than the engagement concave portion for the falling-down position and the engagement concave portion for the standing position, and connecting the engagement concave portion for the falling-down position and the engagement concave portion for the standing position so as to guide the cam pin to the engagement concave portion for the falling-down position and the engagement concave portion for the standing position; and
wherein the link mechanism is composed of the sphere member, the cam pin, the projecting wall portion, the spherical space, the engagement concave portion for the falling-down position, the engagement concave portion for the standing position, and the cam groove.

5. The image display apparatus according to claim 4, wherein the projecting wall section has a side wall standing from the portion of the rear surface and a rear wall connecting the trailing edge of the side wall;
the spherical space is formed at the outside of the projecting wall section in an open fashion by a cutout portion extending toward the side wall from the rear wall; and
the edge of the cutout portion is locked to the rod to prevent the casing from falling down at the standing position.

\* \* \* \* \*